(12) United States Patent
Torgersrud et al.

(10) Patent No.: US 10,397,785 B2
(45) Date of Patent: *Aug. 27, 2019

(54) HANDHELD VIDEO VISITATION

(71) Applicant: Intelmate LLC, San Francisco, CA (US)

(72) Inventors: Richard Torgersrud, San Francisco, CA (US); Kevin O'Neil, Parma, ID (US)

(73) Assignee: Intelmate LLC, San Francisco, CA (US)

( * ) Notice: Subject to any disclaimer, the term of this patent is extended or adjusted under 35 U.S.C. 154(b) by 65 days.

This patent is subject to a terminal disclaimer.

(21) Appl. No.: 15/660,780

(22) Filed: Jul. 26, 2017

(65) Prior Publication Data

US 2017/0325096 A1    Nov. 9, 2017

Related U.S. Application Data

(63) Continuation of application No. 14/216,993, filed on Mar. 17, 2014, now Pat. No. 9,749,863.

(60) Provisional application No. 61/801,861, filed on Mar. 15, 2013.

(51) Int. Cl.
| | |
|---|---|
| *H04N 7/14* | (2006.01) |
| *H04W 12/08* | (2009.01) |
| *H04W 12/06* | (2009.01) |

(52) U.S. Cl.
CPC ............ *H04W 12/08* (2013.01); *H04N 7/141* (2013.01); *H04W 12/06* (2013.01)

(58) Field of Classification Search
CPC .............................. H04W 12/06; H04W 12/08
USPC .... 348/14.01–14.16; 379/37–52, 67.1–88.28
See application file for complete search history.

(56) References Cited

U.S. PATENT DOCUMENTS

| | | | |
|---|---|---|---|
| 6,075,983 A | 6/2000 | Kumagai | |
| 6,101,242 A * | 8/2000 | McAllister | .......... H04Q 3/0045 379/201.02 |
| 6,195,568 B1 | 2/2001 | Irvin | |
| 6,542,729 B1 | 4/2003 | Chmaytelli et al. | |
| 6,665,380 B1 | 12/2003 | Cree et al. | |
| 7,529,357 B1 | 5/2009 | Rae et al. | |
| 7,738,916 B2 | 6/2010 | Fukuda | |
| 7,860,222 B1 | 12/2010 | Sidler et al. | |

(Continued)

*Primary Examiner* — Hemant S Patel
(74) *Attorney, Agent, or Firm* — Ferguson Braswell Fraser Kubasta PC

(57) ABSTRACT

An inmate mobile device for communicating with an outsider mobile device is provided. An identity data item, of the device, includes an inmate identifier of an inmate user of the inmate mobile device, a verified data and a restrictions repository. Also included is a media capture module configured to obtain an initial verification data from the inmate user of the inmate mobile device, and an outsider client application configured to receive the initial verification data from the media capture module, determine that the inmate verification data and the inmate verified data match, generate a connection request targeting the outsider mobile device. The connection request includes the inmate identifier of the inmate user and an outsider identifier of an outsider user of the outsider mobile device. The inmate application is also further configured to send the connection request to a server system.

20 Claims, 12 Drawing Sheets

(56) References Cited

U.S. PATENT DOCUMENTS

| | | | | |
|---|---|---|---|---|
| 8,031,849 B1* | 10/2011 | Apple | ............... | H04M 15/08 |
| | | | | 379/114.03 |
| 3,160,219 A1 | 4/2012 | Bayne | | |
| 8,160,219 B2* | 4/2012 | Bayne | ............... | H04M 3/56 |
| | | | | 379/114.05 |
| 8,374,324 B2* | 2/2013 | Suryanarayana | ..... | H04W 12/06 |
| | | | | 340/5.82 |
| 8,676,162 B2 | 3/2014 | Rathus et al. | | |
| 9,075,967 B2 | 7/2015 | Marshall | | |
| 9,749,863 B2* | 8/2017 | Torgersrud | ............ | H04W 12/08 |
| 2003/0139192 A1* | 7/2003 | Chmaytelli | ........... | H04M 1/673 |
| | | | | 455/463 |
| 2004/0066916 A1* | 4/2004 | Brown | ............... | H04M 3/42 |
| | | | | 379/88.01 |
| 2005/0105699 A1 | 5/2005 | Ueyama | | |
| 2008/0000966 A1 | 1/2008 | Keiser | | |

\* cited by examiner

HANDHELD VIDEO VISITATION

CROSS-REFERENCE TO RELATED APPLICATIONS

The present application is a continuation application of and, thereby, claims benefit of priority under 35 U.S.C. § 120 to U.S. application Ser. No. 14/216,993, entitled, "Handheld Video Visitation," filed on Mar. 17, 2014, and incorporated herein by reference. U.S. application Ser. No. 14/216,993 application claims the benefit of priority of U.S. Provisional Patent Application Ser. No. 61/801,861, filed on Mar. 15, 2013, entitled "Handheld Video Visitation," and is herein incorporated by reference.

BACKGROUND

Controlled facilities, such as a jail, prison, detention facility, secured hospital, or addiction treatment facility, house large populations of individuals in confinement, which presents unique administrative challenges. In such detention environments, detained individuals, such as inmates, prisoners, offenders, convicts, military personnel, patients, government cleared personnel, or other detainees, frequently desire to communicate with individuals outside the detention environment such as friends or family members.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to handheld video visitation for inmates.

Figure 1:
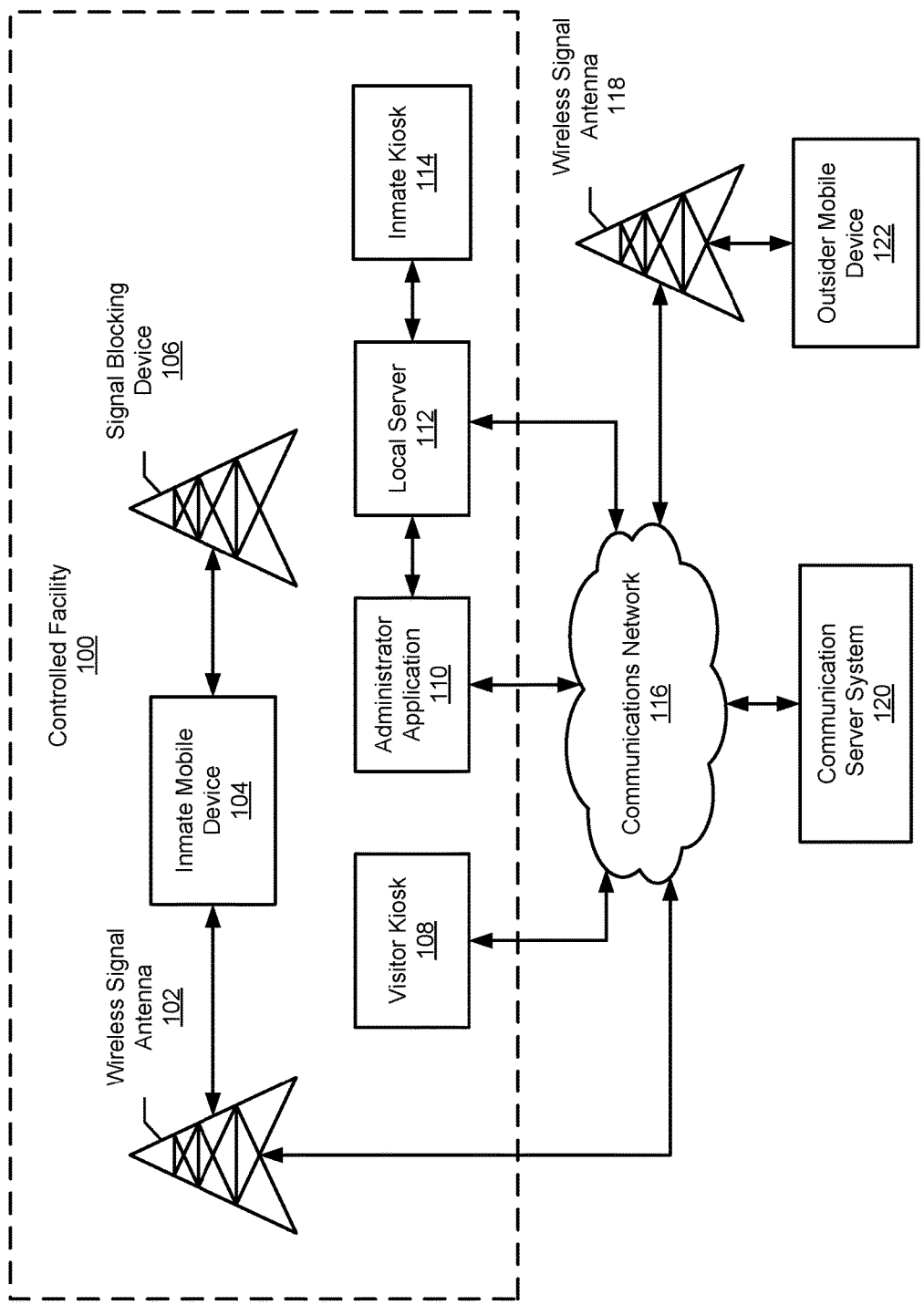
FIG. 1 shows a system in accordance with one or more embodiments of the invention.

FIG. 1 shows a diagram of a system in accordance with one or more embodiments of the invention. As shown in FIG. 1, the system includes a controlled facility (100), two wireless signal antennas (wireless signal antenna (102) and wireless signal antenna (118)), an inmate mobile device (104), a signal blocking device (106), a visitor kiosk (108), an administrator application (110), a local server (112), an inmate kiosk (114), a communications network (116), a communication server system (120) and outsider mobile device (122).

In one or more embodiments of the invention, a controlled facility (100) is an access-restricted location in which an inmate resides. Examples of controlled facilities (e.g., controlled facility (100)) include, but are not limited to, detention environments (e.g., jails, prisons, etc.), immigration detention centers, military centers, government secure sites, law enforcement holding structures, and psychiatric hospitals.

In one or more embodiments of the invention, an inmate is a resident of a controlled facility (100) and is subject to one or more restrictions, primarily to his or her freedom or rights. Such restrictions may be part of a court-imposed sentence on an inmate, while others may be specific to the controlled facility (100) in which the inmate resides. Restrictions may include limitations on an inmate's physical movement (i.e., physical restrictions) and limitations on the inmate's ability to communicate (i.e., communication restrictions). Communication restrictions include inmate use restrictions, inmate target restrictions, and device use restrictions.

In one or more embodiments of the invention, inmate use restrictions are limitations on an inmate's general ability to communicate with visitors and/or outsiders. Inmate use restrictions may include, for example, periods of time in which an inmate is not allowed to communicate with outsiders or visitors (e.g., between 10 PM and 8 AM, during an imposed one-week punitive period, etc.) and limitations based on lack of funds (e.g., insufficient commissary account balance to initiate a communication).

In one or more embodiments of the invention, inmate target restrictions are limitations on the target or source of a communication with the inmate. Inmate target restrictions may be specific outsiders or visitors with whom the inmate is not allowed to communicate (e.g., the victim of a crime perpetrated by the inmate, etc.). Inmate target restrictions may also include types of people with whom the inmate is not allowed contact (e.g., outsiders who are ex-cons, minors under the age of 18, etc.).

In one or more embodiments of the invention, device use restrictions are restrictions based on the condition or state of the communication device used by the inmate. Device use restrictions include, for example, limitations based on the location of the inmate's mobile device, limitations imposed based on a determination that the device has been tampered with, etc.

In one or more embodiments of the invention, an outsider is a person outside the controlled facility (100) who may be the source or target of a communication with an inmate. An outsider who enters the controlled facility (100) for the purpose of communicating with an inmate is referred to as a visitor.

In one or more embodiments of the invention, wireless signal antenna (102) and/or wireless signal antenna (118) are antennas used to propagate wireless signals. The wireless signals may be of any strength and type now known or later developed.

In one or more embodiments of the invention, the inmate mobile device (104) is a device with functionality to send and receive audio communications between an inmate and an outsider or visitor. For example, inmate mobile device (104) may be a computing device such as a smart phone, laptop, tablet, or other suitable device. Specifically, the inmate mobile device (104) may be used to send or receive text messages and/or initiate or receive voice or video calls. In one embodiment of the invention, the inmate mobile device (104) also enables an inmate to access a secure social network. Specifically, the inmate mobile device (104) may be used to upload media to, or view media from, a secure social network account of the inmate or another secure social network member. In one or more embodiments of the invention, inmate mobile device (104) executes an inmate application (not shown) that provides the functionality described above.

In one or more embodiments of the invention, signal blocking device (106) is a device that blocks, or severely limits wireless signals, such as those from wireless signal antenna (102) and wireless signal antenna (118). Signal blocking device (106) may block the wireless signals in any manner now known or later developed.

In one or more embodiments of the invention, kiosks (e.g., visitor kiosk (108) and/or inmate kiosk (114)) may be used by inmates, visitors, or others for communication, entertainment, and/or any other purpose. Visitor kiosk (108) and/or inmate kiosk (114) is a computing system with functionality to facilitate communication between an inmate and a visitor or outsider. Such communication facilitation may include creating a system identity data item or secure social networking account, adding or importing contact information for outsiders with whom the inmate wishes to communicate, uploading media (e.g., photos, videos, audio, and text) to, or viewing media from, a secure social network, sending or receiving messages or other media, acting as an endpoint for voice and video communication between an inmate and a visitor or outsider, scheduling a communication, and managing a commissary account. In one or more embodiments of the invention, visitor kiosk (108) is for visitors, while inmate kiosk (114) is inmates. Thus, visitor kiosk (108) and inmate kiosk (114) may have minor distinctions between them, such as increased use restrictions on inmate kiosk (114), and/or any other suitable modifications. Alternatively, visitor kiosk (108) and inmate kiosk (114) may be identical, except that inmate kiosk (114) is located in an area accessible to inmates. It will be apparent to one of ordinary skill in the art that visitor kiosk (108) and/or inmate kiosk (114) may have many different components and functionalities and, as such, the invention should not be limited to the above examples.

In one or more embodiments of the invention, the administrator application (110) is a process or group of processes executing on a computing system with functionality to enable an administrator to create, remove, and/or enforce one or more restrictions on an inmate. In one embodiment of the invention, an administrator is a person associated with the controlled facility charged with enforcing one or more restrictions. Examples of administrators include, but are not limited to, prison guards, orderlies, wardens, prison staff, jailers, information technology technicians, system administrators, and law enforcement agents. Using the administrator application, an administrator may retrieve or alter the identity data item and/or secure social network account of an inmate, visitor, or outsider. Further, in one or more embodiments of the invention, the administrator application (110) provides access to communications between inmates at the controlled facility (100) and visitors, outsiders, and other inmates. The administrator application (110) may also be used to monitor current voice or video calls between an inmate and a visitor, outsider, or other inmate. In one embodiment of the invention, the administrator application (110) may provide heightened access (i.e., a level of access greater than that of the inmate, visitor, or outsider) to data stored in the secure social networking account.

Specifically, the view administrator application (110) sees of the timeline will typically include access to all data normally hidden from visitor and inmate timelines, including all messages, photos (both approved and rejected), and a link to all video visitation archives and telephone call recordings, all of which are presented on the admin's view of the inmate's or visitor's timeline. This view of the timeline is a powerful investigator tool, allowing the admin to research and review all electronic communications a given person has had in relation to an inmate, parolee, or visitor of interest. This version of the application also provides real-time notifications (using the same push, IM, SMS, and MMS methods described above) of requests for visitation. Such notifications will typically contain the current results of the authorization checks described above. Using this information, the admin may approve, deny, or cancel a previously (automatically or human-) approved visitation request directly from within the application. In the case where the visitor's authorization check has indicated outstanding warrants (for arrest, as a person-of-interest in a criminal investigation, or other reason), the admin may elect to authorize said visitation request, and arrange with law enforcement officials to track the visitor using any GPS or other tracking information available on the device the visitor is using for the video visitation, or may modify the visitation, changing it to a request by the detainee for an in-person or on-site visit, or perhaps even a surprise release for medical reasons or good behavior, which would aid law-enforcement officials in apprehending the visitor with outstanding warrants, by encouraging the visitor to show up at the secure facility to collect the detainee.

In one or more embodiments of the invention, the local server (112) is a computer system or group of computers systems located within the controlled facility (100) that facility communication between inmates and visitors, outsiders, and/or other inmates. Specifically, the local server (112) may implement the software necessary to host voice and video calls between and among the visitor kiosk (108), the inmate kiosk (114), and a outsider mobile device (122). The local server (112) may also include functionality to enforce communication restrictions associated with the inmates using the inmate kiosk (114) or inmate mobile device (104). Alternatively, the local server (112) may merely provide access to other systems capable of hosting the communication software and data storage (e.g., located within an offsite facility or a third party provider). Further, in one embodiment of the invention, the local server (112) includes functionality to regulate inmate access to a secure social network.

In one or more embodiments of the invention, the elements within the controlled facility (100) are communicatively coupled to the communications network (116). In one embodiment of the invention, the communications network (116) is a collection of computing systems and other hardware interconnected by communication channels. The communications network (116) may include networks that are exclusively or primarily used for a single type of communication, such as a telephone network (e.g., Public Switched Telephone Network (PSTN) or Plain Old Telephone System (POTS)), and/or networks used for a wide array of communication types, such as the Internet through Voice over IP (VoIP). Communication channels used by the communications network (116) may include, for example, telephone lines, networking cables, wireless signals, radio waves, etc. Fees charged and payments received by the provider(s) of the communications network (116) may involve multiple parties, including a service provider, the management of the controlled facility (100), and provider(s) of the communications network (116). In one or more embodiments of the invention, fees may be split between multiple parties based on the terms of underlying agreements or contracts between the parties. Further, rebates, reimbursements, and/or refunds may be afforded to and paid to the management of the controlled facility (100) based on the terms of underlying agreements or contracts between the parties. For example, the management of the controlled facility (100) may receive a rebate from the service provider of the services provided to inmates based on such factors as the volume of use, the dollar amount, and/or the frequency of use.

In one or more embodiments of the invention, communication server system (120) is any server, computer, rack, desktop computer, laptop computer, or other suitable computing device. Communication server system (120) is discussed in more detail in FIG. 2.

In one or more embodiments of the invention, outsider mobile device (122) is any suitable mobile device, such as a smart phone, laptop, tablet, etc. Specifically, outsider mobile device (122) is able to communicate with inmate mobile device (104), authenticate the visitor, and/or any other functionality for communicating with an inmate. Outsider mobile device (122) may execute a visitor application that provides the functionality discussed above.

Optionally, the system of FIG. 1 may include an application for victims of a crime (not shown). The application is intended for use by crime victims and others who may feel threatened by a particular inmate (such as judges, jurors, police officers, etc.) allows such victims and other individuals to subscribe to information about specific incarcerated and formerly incarcerated individuals, ideally anonymously, and be notified automatically by the application, preferably using push notification, of events relating to the incarcerated or formerly incarcerated individual. These events may include, but are not limited to, parole hearings, trial dates, release dates, new arrests, new charges, and anything else in the public record that may serve to increase the safety and/or peace-of-mind of the anonymous user.

For instance, if a formerly incarcerated individual is subject to a keep-away restraining order, and the anonymous victim chooses, the application may indicate an alert whenever available tracking systems (such as a GPS ankle band or a handheld computing device with tracking features enabled, such as a mobile phone configured for parolee monitoring) indicate the subject of the restraining order has come within a specified distance of the protected individual. Upon this alert, the authorities responsible for the person subject to the restraining order may be automatically notified of the violation, and/or the protected individual may be given instructions on which direction will increase the distance between him and the subject bound by the restraining order.

Figure 2:
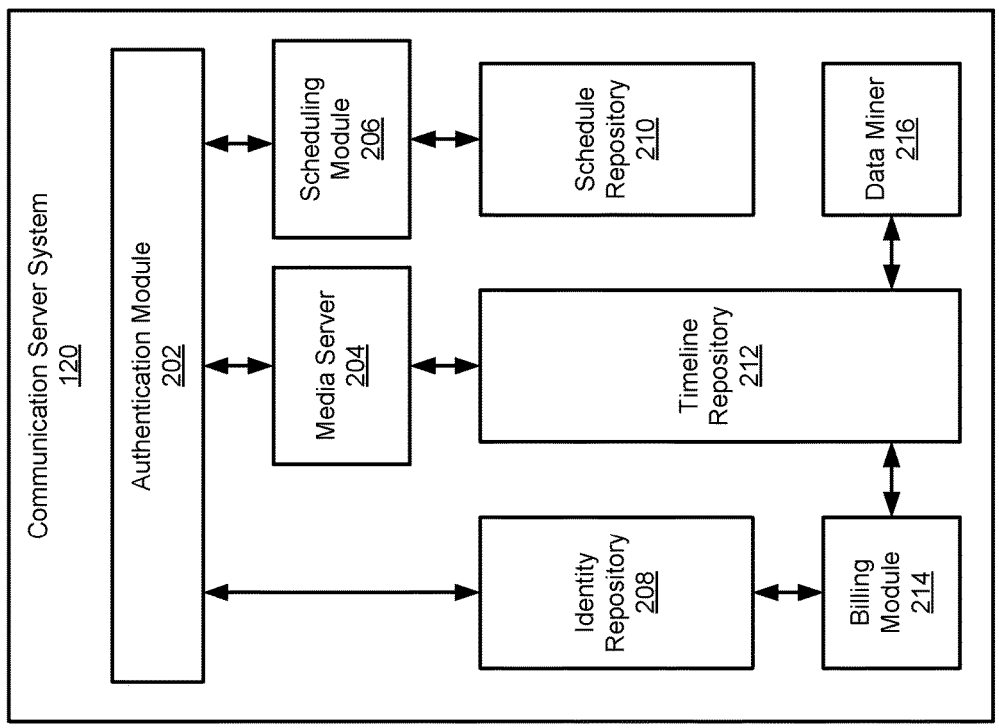
FIG. 2 shows a diagram of a server system in accordance with one or more embodiments of the invention.

FIG. 2 shows communication server system (120) in detail, in accordance with one or more embodiments of the invention. Communication server system (200) includes authentication module (202), media server (204), scheduling module (206), identity repository (208), schedule repository (210), timeline repository (212), billing module (214), and data miner (216).

In one or more embodiments of the invention, authentication module (202) authenticates/verifies inmates, visitors, outsiders, and/or anyone communicating using this invention. Specifically, the authentication may take may different forms including voice, picture/video, passwords, fingerprints, and/or any other method of verifying identities and/or authenticating individuals. Authentication module (202) may utilize a voice ID audio clip that was previously recorded by the inmate. The pre-recorded clip can be recorded under the supervision of administrative staff, and may be, for example, a recording of an inmate stating their name or another short phrase. When authentication is needed, the inmate is requested to speak the pre-recorded phrase. After speaking the phrase and being authenticated, the inmate may log into the system. The authentication module (202) records the phrase spoken by the inmate, and compares a digital signature of the audio to the pre-recorded audio clip. The pre-recorded clips may be created and stored locally at the kiosk or mobile device, or may be created by another mechanism and stored at, for example, a database. Accordingly, the comparison may be made by software on the kiosk or at the processing center. If the recorded audio matches the prerecorded audio clip, the inmate is granted access.

In one or more embodiments of the invention, authentication module (202) is able to use facial verification either separately or in combination with one or more of the other verification systems, including Personal Identification Number (PIN) verification and the voice verification. For facial verification, the inmate may line up their eyes with the eye level marks displayed on the kiosk or mobile device. This ensures that an appropriate image is captured for verification.

As with voice verification, facial verification processing may be performed locally or remotely. In either case, the facial verification processing includes comparing an image captured by a camera with a pre-stored image of the inmate. Authentication module (202) may use facial "landmarks" generated by mathematical formulas to present a score which indicates a likelihood that the captured image matches the pre-stored image. If the images match to a sufficient degree, the verification is approved and the inmate is granted access to the system. If the images do not match, the system may store the captured image and other usage details for review by administration officials.

In one or more embodiments of the invention, media server (204) is a computing system or group of computing systems with functionality to provide network application services to facilitate communication between an inmate and an outsider, and to facilitate access to a secure social network. Such services include, but are not limited to, voice-over-internet-protocol (VoIP) services, video conferencing services, and media streaming services.

In one or more embodiments of the invention, scheduling module (206) is responsible for scheduling communications involving inmates. For example, requests for scheduled or immediate remote or on-site video visitations may be made at or by any kiosk, mobile device, or other suitable computing device. Scheduling module (206) handles the scheduling in conjunction with authentication module (202), discussed above. Once arranged, authorized, and connected, the audio and video portions of the remote visit are handled by and travel through the media server (204).

In one or more embodiments of the invention, identify repository (208) is used to store authentication information created and/or used by authentication module (202).

In one or more embodiments of the invention, schedule repository (210) is used to store scheduling information created and/or used by scheduling module (206).

In one or more embodiments of the invention, timeline repository (212) is a repository for data relating to a social networking site associated with this inmate. Timeline repository (212) may not display every item stored on it on a timeline of an associated inmate, some items may be rejected or withheld based on a variety of factors. In one or more embodiments of the invention, timeline repository (212) stores, for example, data about a video visitation after the conclusion of the visitation. The data stored may include the date and start time, duration, and profile photos of the parties communicating may be posted to the social networking "wall" or—"timeline" for each participant. As secure environments rarely, if ever, permit either visitors or inmates to view recordings of past video visitations, even though such visitations are typically recorded and archived for use by investigators, the actual video of the visitation is typically not included in said timeline. However, during a video visitation, both parties may be allowed to engage in instant messaging (IM) types of chats. These may be optionally included in the parties' timelines, if permitted by facility rules.

In one or more embodiments of the invention, timeline repository (212) may store electronic text messages and/or photos exchanged between detainees and visitors, optionally for a fee. These will typically be entered into a review queue, instead of being immediately displayed on the social networking timeline. Such messages and/or photos will typically need approval by a suitably authorized individual working at or on behalf of the secure facility. If and when approved, these messages and/or photos may then be displayed on the visitor and/or inmate timelines.

Additionally, the visitor is provided the means of cross-posting photos uploaded to timeline repository (212) to common publicly available social networking services, such as but not limited to Facebook, FourSquare, and Flickr. These photos may be posted only if sufficient funds and permission are available to the visitor, and will typically be held in the aforementioned review queue before being posted on, even if they are immediately posted to the public service such as Facebook, FourSquare, or Flickr. As posted there, they may or may not have any indication that they were taken or uploaded in conjunction with an inmate. As is frequently practiced with photos uploaded to such social networking sites, such photos will often have geographic coordinates or other data associated with them, either by means of a GPS or similar position-determining device or service, or by means of manual input, or by a combination of both methods (as is practiced in the FourSquare service, where the GPS position is used to display a list of nearby well-known business locations or other points-of-interest). Such information will often be of interest and value to the inmate, the visitor, and also the facility's investigators.

In addition to the human-generated content, timeline repository (212) may also include automatically generated content related to the inmate, such as dates of upcoming court appearances, parole hearings, release or parole dates, and other such items. These items may be displayed both in the timeline as a historical record, and in a separate list that highlights upcoming events. Additionally, when any of these dates are initially scheduled, that event may be recorded in the timeline.

In one or more embodiments of the invention, In one or more embodiments of the invention, the billing module (214) is responsible for payments made for or using a mobile device. Optionally, the functionality associated with the billing module (214) may be located on any other suitable component. Billing module (214) may facilitate an inmate making payments from the prisoner's commissary or communications account, or any other account allowed by the prison or controlled facility including, but not limited to: checking accounts, savings account, credit cards, gift cards, online payment accounts, and/or any other account. In one or more embodiments of the invention, family or friends of the inmate may place funds into a special account strictly for payment of fees associated with a mobile device, which the inmate may then access for payment of any fees associated with a mobile device or the usage of a mobile device.

In one or more embodiments of the invention, data miner (216) is an application or module for use by administration, investigators, and other similar people. Data miner (216) comprises functionality for mining data stored on Communication Server System (120) and is typically used for investigating crimes, criminal behavior, rule breaking, safety issues, and/or any other reasons. In one or more embodiments, the functionality described for data miner (216) may be associated with a different application or device, such as administrator application (110).

Figure 3:
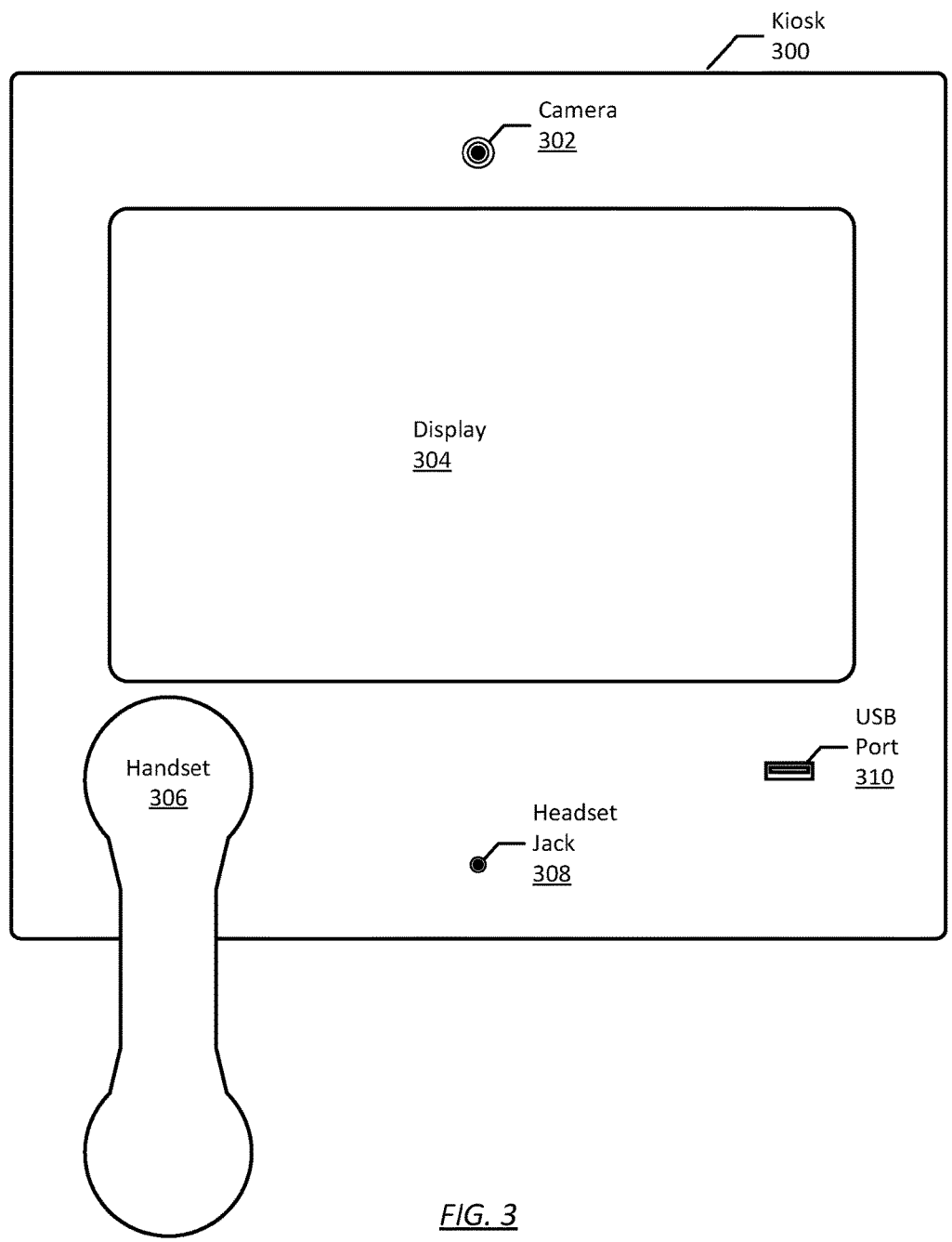
FIG. 3 shows a diagram of a kiosk in accordance with one or more embodiments of the invention.

FIG. 3 shows kiosk (300) in accordance with one or more embodiments of the invention. Kiosk (300) includes an integrated camera (302) that can be used for video communications or for user authentication via facial recognition. The kiosk also includes a display (304) that displays images and may be able to detect the presence and location of a user's touch within the display area. Display (304) may be, for example, a 15-inch capacitive or resistive touch screen display. The touch screen serves as the main kiosk interface with a user. A telephone handset (306) connected to the kiosk includes a speaker (not shown) and a microphone (not shown). Handset (306) can be used to issue voice commands and provide voice authentication as required, or it can be used for voice and video communications, among other things. Handset (306) is just one possible embodiment of audio capture and playback, as a kiosk user may, for example, instead plug in a headphones or headset with an in-line microphone using one or more headphone jack (308), or may use a speakerphone (speaker and microphone combined with additional audio processing hardware) (not shown). Headphone jack (308) may also be located on the side of the kiosk or behind a movable panel, which can be locked in a position exposing the jacks or in a position blocking them, depending on the preferences of the facility. In one or more embodiments of the invention, USB port (310) is located behind a movable panel and can be used for system diagnostics by technicians or to synchronize files to an external device, such as a portable media player. The kiosk also includes a speaker (not shown) that provides audio output.

While FIG. 3 shows kiosk (300) as a wall-mountable kiosk, other structural forms, enclosures, or designs are possible. Kiosk (300) may be any shape or size suitable to providing the described components and services. Kiosk (300) may be, for example, a standalone structure, a personal computer, a laptop, a mobile device, or a tablet computer device. If kiosk (300) is in the form of a laptop, mobile device, or tablet computer, it may be a ruggedized device designed to withstand physical shock, and may be integrated with a docking system that connects to the device for locking, storage, display, additional connectivity and/or charging. Kiosk (300) may be tethered to a structure by known methods, such as a security lock cable. Further, kiosk (300) may include any of the components described below in FIG. 4.

Figure 4:
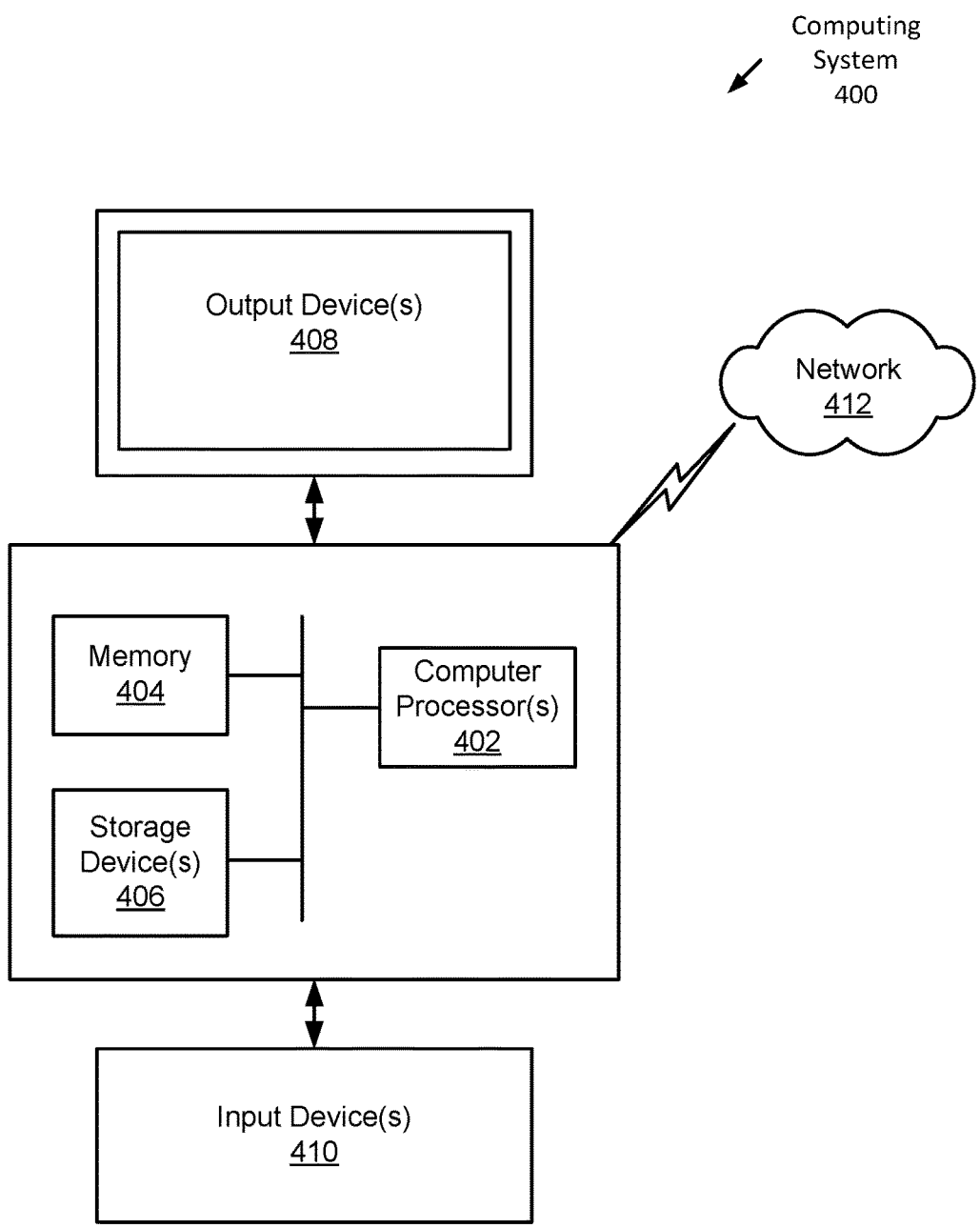
FIG. 4 shows a computer system in accordance with one or more embodiments of the invention.

FIG. 4 shows a general computing system in accordance with one or more embodiments of the invention. As shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (414) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Figure 5:
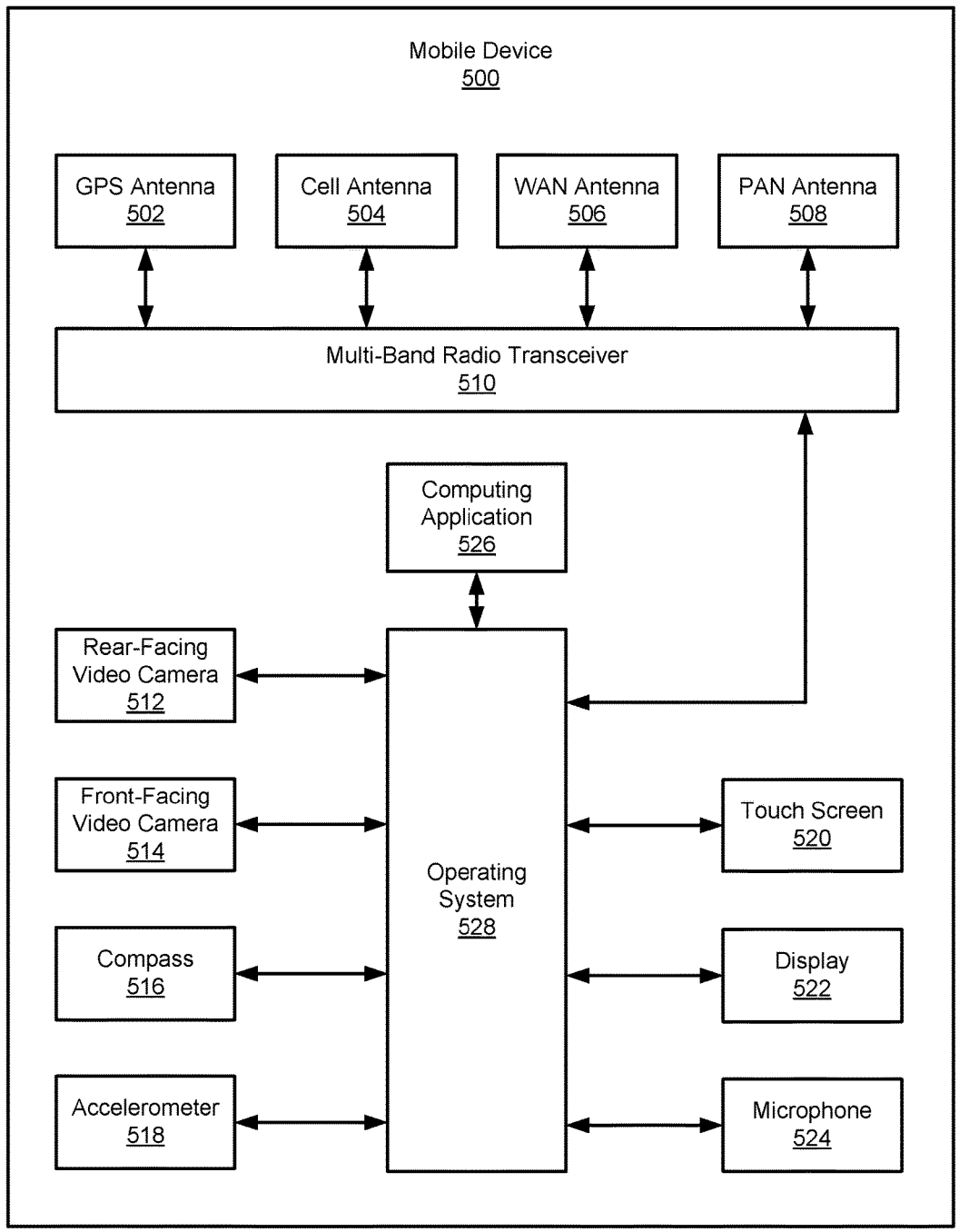
FIG. 5 shows a mobile device in accordance with one or more embodiments of the invention.

FIG. 5 shows the hardware and software elements of a mobile computing device in accordance with one or more embodiments of the invention. Specifically, the mobile device (500) is a portable device that provides a user interface. Examples of mobile devices may include, but are not limited to, cellular phones, personal digital assistants, personal communicators, pagers, smart phones, or any other computing device. The hardware and software elements shown in FIG. 5 may be in addition to the elements described in FIGS. 3 and 4.

As shown in FIG. 5, the mobile computing device (500) includes a global positioning system (GPS) antenna (502), a cell antenna (504), a wide area network (WAN) antenna (506), and a personal area network (PAN) antenna (508), each connected to a multi-band radio transceiver (510). GPS antenna (502) includes functionality to obtain a location coordinate of the mobile computing device (500). Mobile computing device (500) may be configured to use the GPS antenna (502) to provide latitude and longitude location coordinates. In one or more embodiments of the invention, the network connection (i.e., via antenna (402), cell antenna (504), WAN antenna (506), PAN antenna (508), and/or multi-band radio transceiver (510)) may be facilitated by a wireless infrastructure (not shown), including one or more transceivers cooperating to facilitate wireless communications to wireless devices. The wireless infrastructure may include one or more routers, switches, microwave links, base stations, optical fibers, or other similar networking hardware or software components. For example, the wireless infrastructure may be a paging network, a cellular network, etc.

The mobile computing device (500) also includes a rear-facing video camera (512), a front-facing video camera (514), a compass (516), an accelerometer (518), a touch screen (520), a display (522), and a microphone (524), all of which may include any functionality or features now known or later developed. The mobile computing device (500) also includes a computing application (526) executing on an operating system (528).

Figure 6:
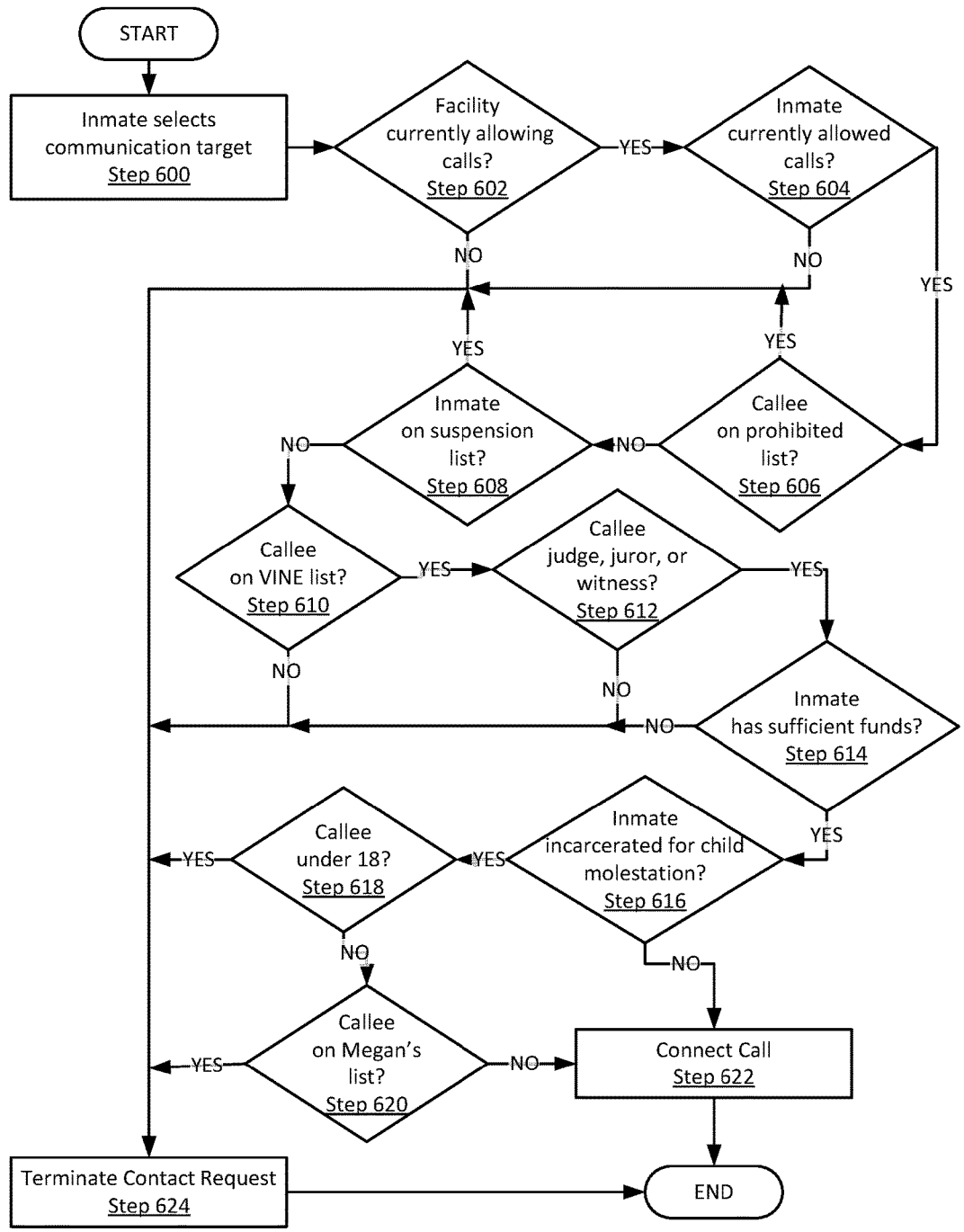
FIG. 6 shows a flowchart of a method for connecting a communication in accordance with one or more embodiments of the invention.

FIG. 6 shows a flowchart of a method for determining whether an inmate is available for communication. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 6 should not be construed as limiting the scope of the invention.

In Step 600, the inmate selects a communication target. The target may be selected in any manner now known or later developed.

In Step 602, a determination is made whether the facility is currently allowing calls. If the facility is not allowing calls, then the method proceeds to Step 624. If the facility is allowing calls, the method proceeds to Step 604. The determination may be made based restrictions established for the facility, or on any other suitable factors.

In Step 604, a determination is made whether the inmate is currently allowed calls. If the inmate is not allowed calls, then the method proceeds to Step 624. If the inmate is allowed calls, the method proceeds to Step 606. The determination may be made based restrictions established for the facility, or on any other suitable factors.

In Step 606, a determination is made whether the callee is on the prohibited list. If the callee is on the prohibited list, the method proceeds to Step 624. If the callee is not on the prohibited list, the method proceeds to Step 608.

In Step 608, a determination is made whether the inmate is on a suspension list. If the inmate is on the suspension list, then the method proceeds to Step 624. If the inmate is not on the suspension list, then the method proceeds to Step 6110.

In Step 610, a determination is made whether the callee is on the Victim Information and Notification Everyday (VINE) list. If the callee is not on the VINE list, then the method proceeds to Step 624. If the callee is on the VINE list, then the method proceeds to Step 612.

In Step 612, a determination is made whether the callee is a judge, juror, or witness. If the callee is a judge, juror, or witness, then the method proceeds to Step 624. If the callee is not a judge, juror, or witness, then the method proceeds to Step 614.

In Step 614, a determination is made whether the inmate has sufficient funds. If the inmate does not have sufficient funds, then the method proceeds to Step 624. If the inmate does have sufficient funds, then the method proceeds to Step 616. The funds may come from any suitable account such as a commissary, communication, checking, saving, or other account.

In Step 616, a determination is made whether the inmate is incarcerated for child molestation. If the inmate is not incarcerated for child molestation, then the method proceeds to Step 622. If the inmate is incarcerated for child molestation, then the method proceeds to Step 618.

In Step 618 a determination is made whether the callee is under 18. If the callee is under 18, then the method proceeds to Step 624. If the callee is over 18, then the method proceeds to Step 620.

In Step 620, a determination is made whether the callee is on Megan's list (i.e., a list of convicted sex offenders) or similar list. If the callee is on Megan's list, then the method proceeds to Step 624. If the callee is not on Megan's list, then the invention proceeds to Step 622.

In Step 622, the call is connected. After Step 622, the method ends.

In Step 624, the call is not connected, and the request is terminated. After Step 624, the method ends.

Figure 7:
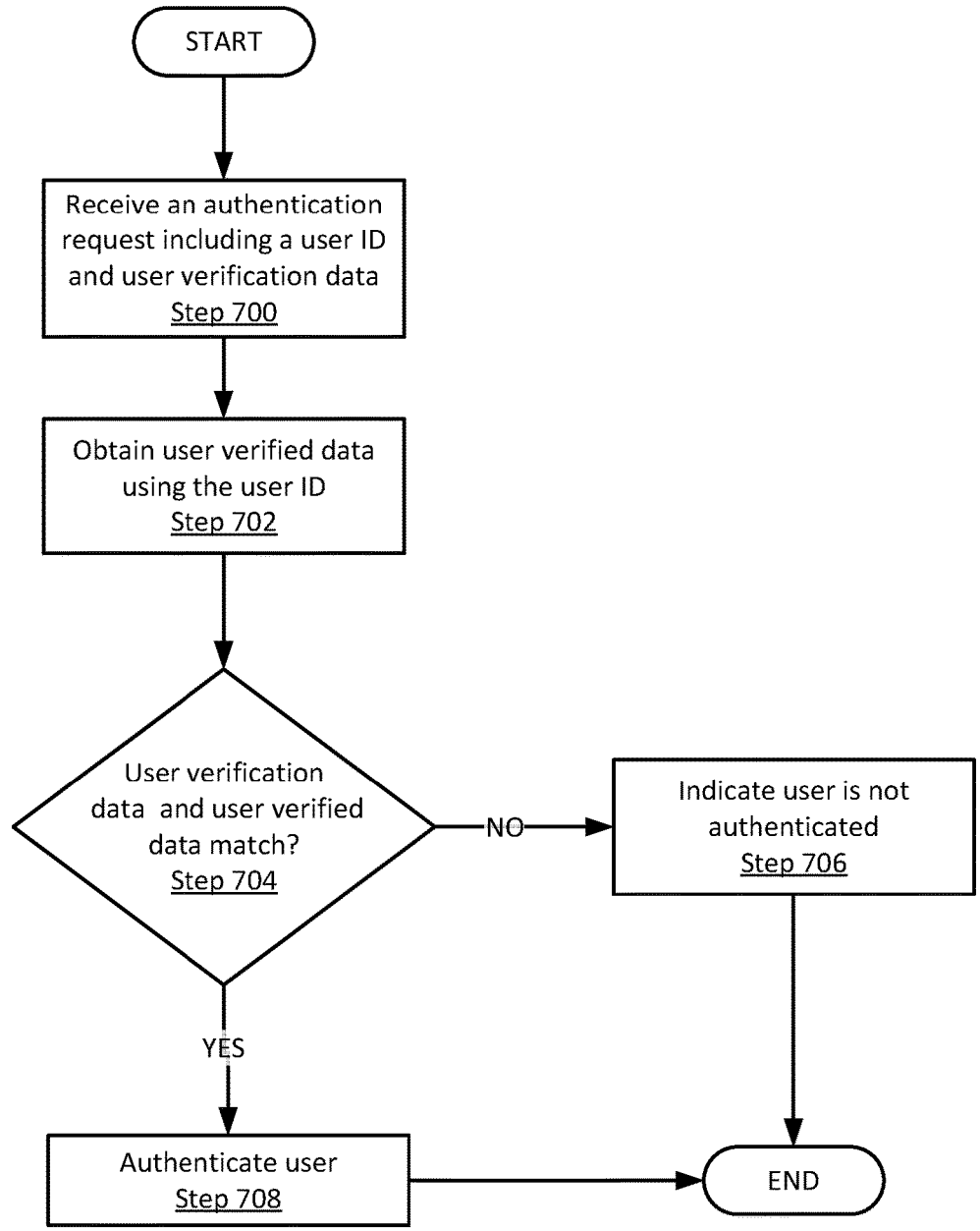
FIG. 7 shows a flowchart of a method for authenticating an individual in accordance with one or more embodiments of the invention.

FIG. 7 shows a flowchart of a method for authenticating an individual, in accordance with one or more embodiments of the invention. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 7 should not be construed as limiting the scope of the invention.

In Step 700, an authentication request including a user ID and user verification data is received. The user ID and verification data may be a username, password, picture, audio, or any other suitable data. For example, the verification data may be a current picture of the inmate taken by a camera of the device making a communication request.

In Step 702, user verified data using the ID is obtained. Verified data is data that is previously associated with the inmate. For example, a picture may be taken of the inmate when he or she receives his or her user ID. This picture may be compared to a current picture taken whenever the inmate logs in to the system to make a communication request.

In Step 704, a determination is made if the user verification data and user verified data match. If there is a match, the method proceeds to Step 708. If there is not a match, the method proceeds to Step 706. The determination may be made using any method now known or later developed.

In Step 706, the user is not authenticated, because there was not a match in Step 704. After Step 706, the method ends.

In Step 708, the user is authenticated, because there was a match in Step 704. After Step 708, the method ends.

Figure 8:
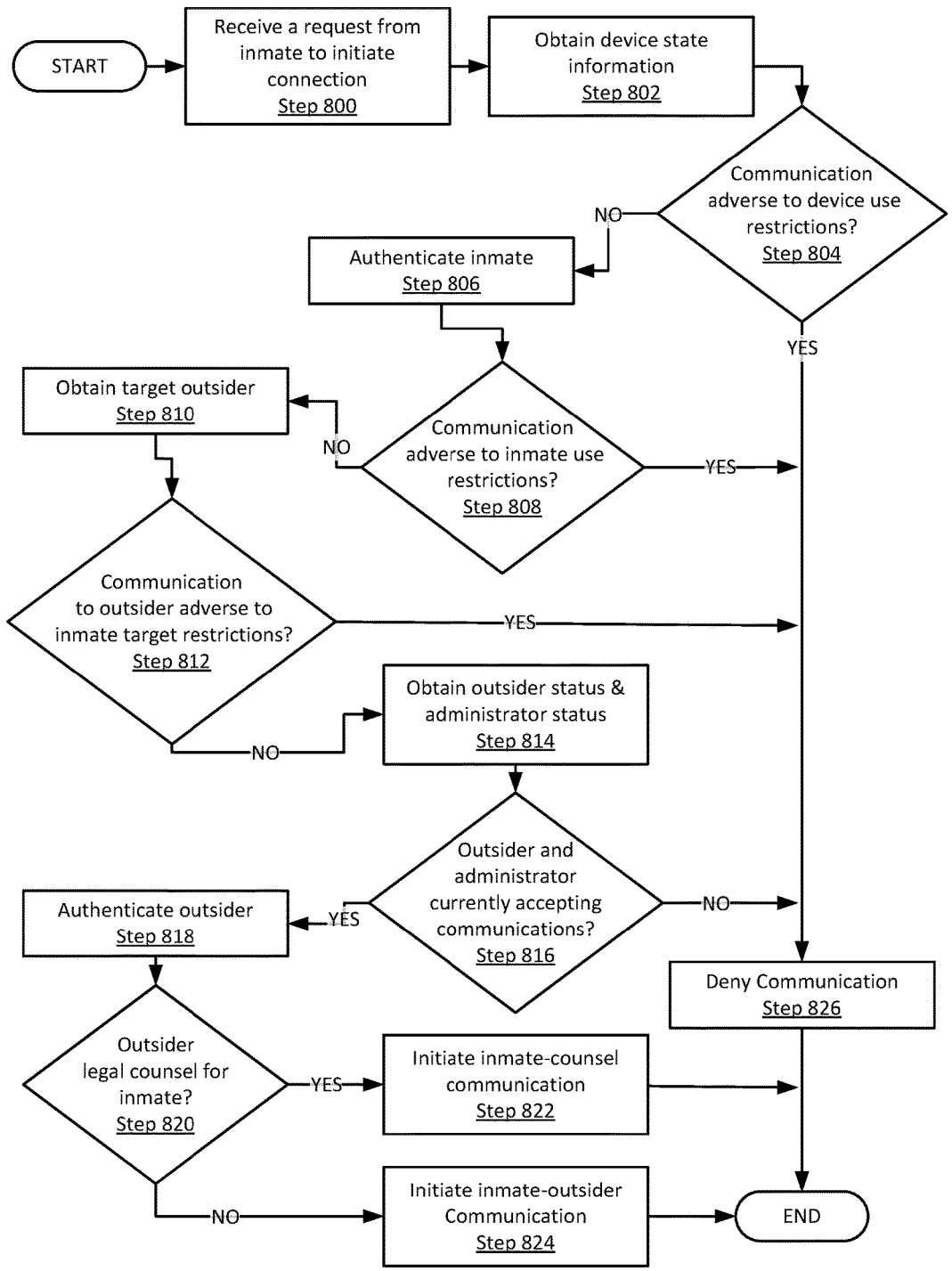
FIG. 8 shows a flowchart of a method for an inmate placing an outgoing communication in accordance with one or more embodiments of the invention.

FIG. 8 shows a flowchart of a method for outgoing inmate communication, in accordance with one or more embodiments of the invention. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 8 should not be construed as limiting the scope of the invention.

In Step 800, a request is received from an inmate to initiate a connection. The request may be received using any method now known or later developed.

In Step 802, device state information is obtained. The device state information may be obtained using any method now known or later developed.

In Step 804, a determination is made whether the communication is adverse to device use restrictions. If the communication is adverse, the method proceeds to Step 826. If the communication is not adverse, the method proceeds to Step 806. The device use restrictions may be set, for example, by the controlled facility where the inmate is located.

In Step 806, the inmate is authenticated. The inmate may be authenticated using, for example, the method described above for FIG. 7. Alternatively, the inmate may be authenticated using any other suitable method.

In Step 808, a determination is made whether the communication is adverse to inmate use restrictions. If the communication is adverse, the method proceeds to Step 826. If the communication is not adverse, the method proceeds to Step 810. The restrictions may be received, for example, from the controlled facility where the inmate is located, and may be received in any manner now known or later developed.

In Step 810, a target outsider is obtained.

In Step 812, a determination is made if the outsider is adverse to inflate target restrictions. If the communication is adverse, then the method proceeds to Step 826. If the communication is not adverse, then the method proceeds to Step 814.

In Step 814, outsider status and administrator status is obtained.

In Step 816, a determination is made whether the outsider and administration are currently accepting communications. If communications are not currently accepted, the method proceeds to Step 826. If communications are currently accepted, the method proceeds to Step 818.

In Step 818, the outsider is authenticated. The outsider may be authenticated using the same method as for inmates, described above in FIG. 7. Alternatively, the outsider may be authenticated using any other suitable method.

In Step 820, a determination is made whether the outsider is a legal counsel for the inmate. If the outsider is not legal counsel, the method proceeds to Step 824. If the outsider is legal counsel the method proceeds to Step 822. The determination may be made based on an approved list of legal counsel, state bar registration lists, and/or any other suitable method.

In Step 822, inmate-counsel communication is initiated. After Step 822, the method ends. Inmate-counsel communication sessions have special privileges and, for example, may not be recorded.

In Step 824, inmate-outsider communication is initiated. After Step 824, the method ends. Inmate-outsider communications typically do not receive special privileges and, as such, the communication will be recorded.

In Step 826, the communication is denied. After Step 826, the method ends. The communication may be denied in any manner now known or later developed.

Figure 9:
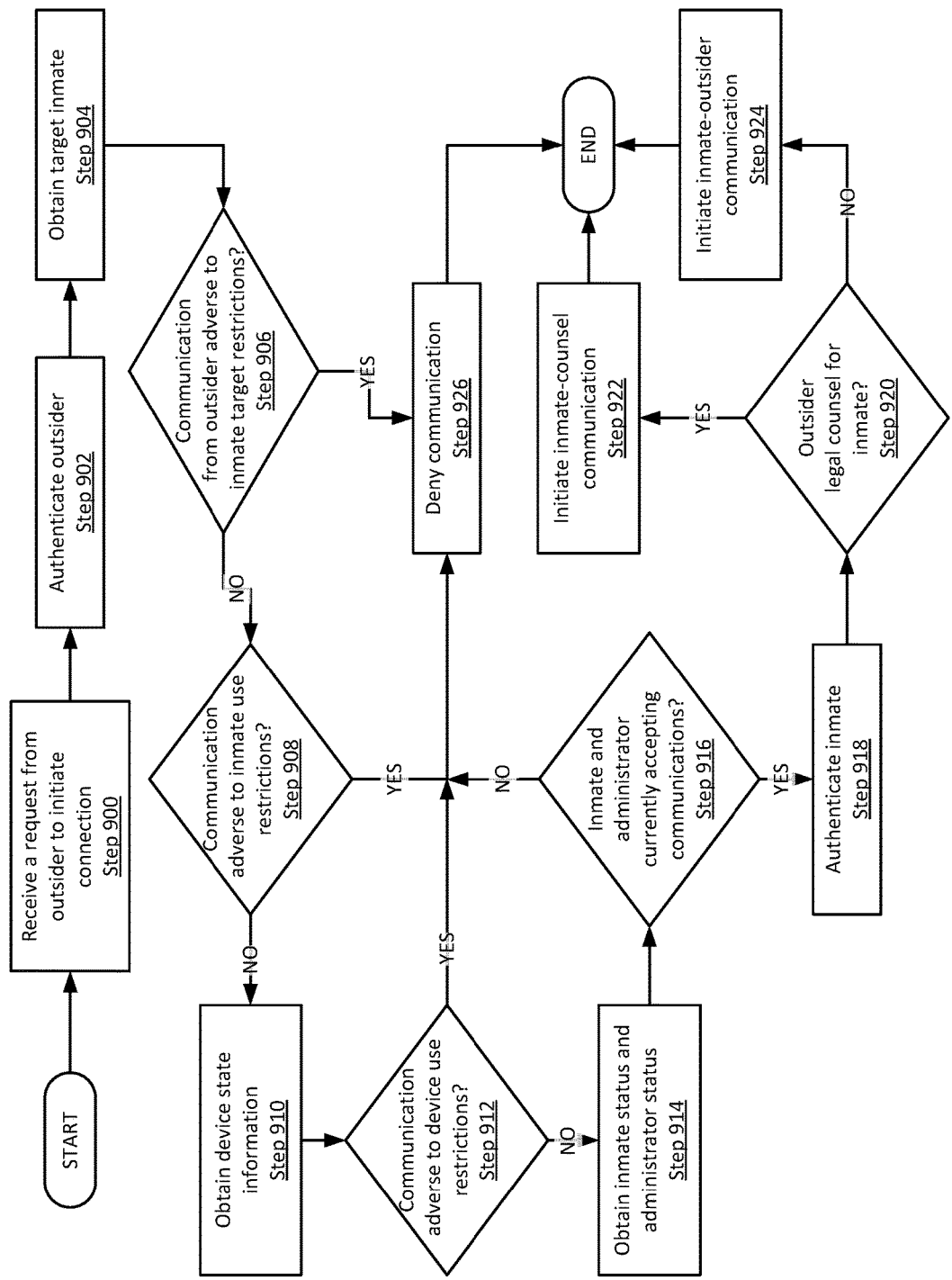
FIG. 9 shows a flowchart of a method for a visitor or outsider placing an incoming call in accordance with one or more embodiments of the invention.

FIG. 9 shows a flowchart of a method for incoming visitor communication, in accordance with one or more embodiments of the invention. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 9 should not be construed as limiting the scope of the invention.

In Step 900, a request is received from an outsider to initiate a connection. The request may be received in any manner now known or later developed.

In Step 902, the outsider is authenticated. The outsider may be authenticated using, for example, the method described above in FIG. 7. Alternatively, the outsider may be authenticated using any suitable method.

In Step 904, a target inflate is obtained.

In Step 906, a determination is made whether the communication is adverse to inmate target restrictions. If the communication is adverse, the method proceeds to Step 926. If the communication is not adverse, the method proceeds to Step 908. The restrictions may be received, for example, from the controlled facility where the inmate is located. Further, the determination may be made in any manner now known or later developed.

In Step 908, a determination is made whether the communication is adverse to inmate use restrictions. If the communication is adverse, the method proceeds to Step 926. If the communication is not adverse, the method proceeds to Step 910. The restrictions may be received, for example, from the controlled facility where the inmate resides. Further, the determination may be made in any manner now known or later developed.

In Step 910, device state information is obtained.

In Step 912, a determination is made whether the communication is adverse to device use restrictions. If the communication is adverse, the method proceeds to Step 926. If the communication is not adverse, the method proceeds to Step 914. The restrictions may be received, for example, from the controlled facility where the inmate is located. Further, the determination may be made in any manner now known or later developed.

In Step 914, inmate status and administrator status is obtained.

In Step 916, a determination is made whether the inmate and administrator are currently accepting communications. If communications are not currently accepted, the method proceeds to Step 926. If communications are currently accepted, the method proceeds to Step 918.

In Step 918, the inmate is authenticated. The inmate may be authenticated using, for example, the method described above in FIG. 7. Alternatively, any other suitable method may be used.

In Step 920, a determination is made whether the outsider is legal counsel for the inmate. If the outsider is not legal counsel, the method proceeds to Step 924. If the outsider is legal counsel, the method proceeds to Step 922.

In Step 922, inmate-counsel communication is initiated. After Step 922, the method ends. Inmate-counsel communication sessions have special privileges and, for example, may not be recorded.

In Step 924, inmate-outsider communication is initiated. After Step 924, the method ends. Inmate-outsider communications typically do not receive special privileges and, as such, the communication will be recorded.

In Step 926, the communication is denied. After Step 926, the method ends. The communication may be denied using any method now known or later developed.

Figure 10:
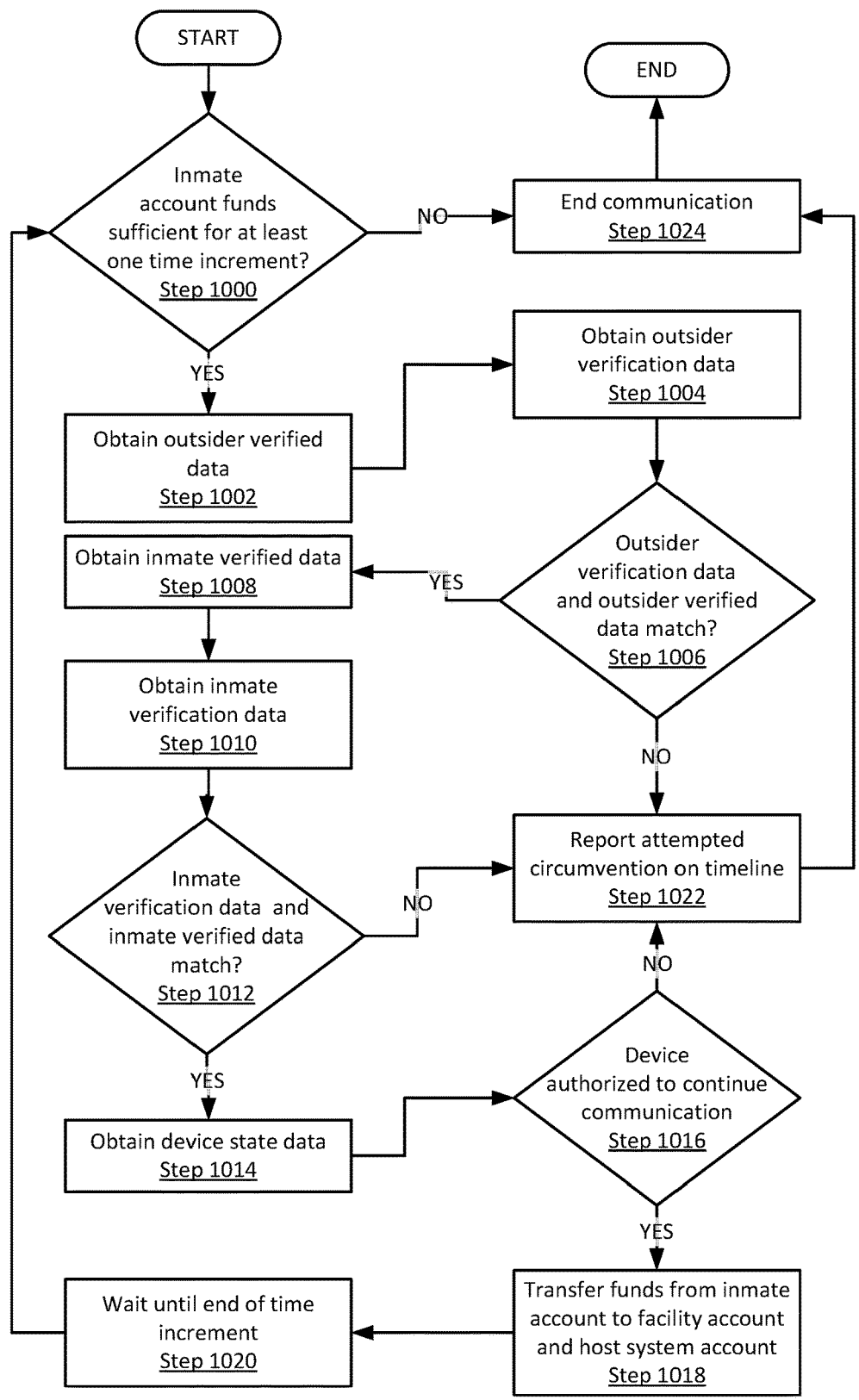
FIG. 10 shows a flowchart of a method for continuous authentication in accordance with one or more embodiments of the invention.

FIG. 10 shows a flowchart of a method for continuous authentication, in accordance with one or more embodiments of the invention. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 10 should not be construed as limiting the scope of the invention.

In Step 1000, a determination is made whether inmate account funds are sufficient for at least one time increment. If the funds are not sufficient, the method proceeds to Step 1024. If the funds are sufficient, the method proceeds to Step 1002. The inmate account may be, for example, a commissary account, a communications account, and/or any other suitable account.

In Step 1002, outsider verified data is obtained. outsider verified data may be, for example, a previously taken photograph, which may then be compared to a current picture taken by the camera of the device making the communication request. The verified data may be of any suitable kind including, but not limited to: audio, pictures, video, text, etc.

In Step 1004, outsider verification data is obtained. The verification data may be any data able to be gathered by the device making the communication request including, but not limited to: pictures, audio, video, text, etc.

In Step 1006, a determination is made whether the outsider verification data and outsider verified data match. If there is not a match, the method proceeds to Step 1022. If there is a match, the method proceeds to Step 1008.

In Step 1008, inmate verified data is obtained. Inmate verified data may be, for example, a previously taken photograph, which may then be compared to a current picture taken by the camera of the device making the communication request. The verified data may be of any suitable kind including, but not limited to: audio, pictures, video, text, etc.

In Step 1010, inmate verification data is obtained.

In Step 1012, a determination is made whether the inmate verification data and inmate verified data match. If there is not a match, the method proceeds to Step 1022. If there is a match, the method proceeds to Step 10114.

In Step 1014, device state data is obtained.

In Step 1016, a determination is made whether the device is authorized to continue communication. If the device is not authorized, the method proceeds to Step 1022. If the device is authorized, the method proceeds to Step 1018.

In Step 1018, funds are transferred from inmate account to facility account and host system account. The funds may be transferred using any method now known or later developed, and the proportion & amount of funds transferred into each account may vary based on a variety of factors.

In Step 1020, the method waits until the end of the time increment and returns to Step 1000.

In Step 1022, an attempted circumvention is reported on the timeline. The report may take any form now known or later developed.

In Step 1024, communication is ended.

Figure 11:
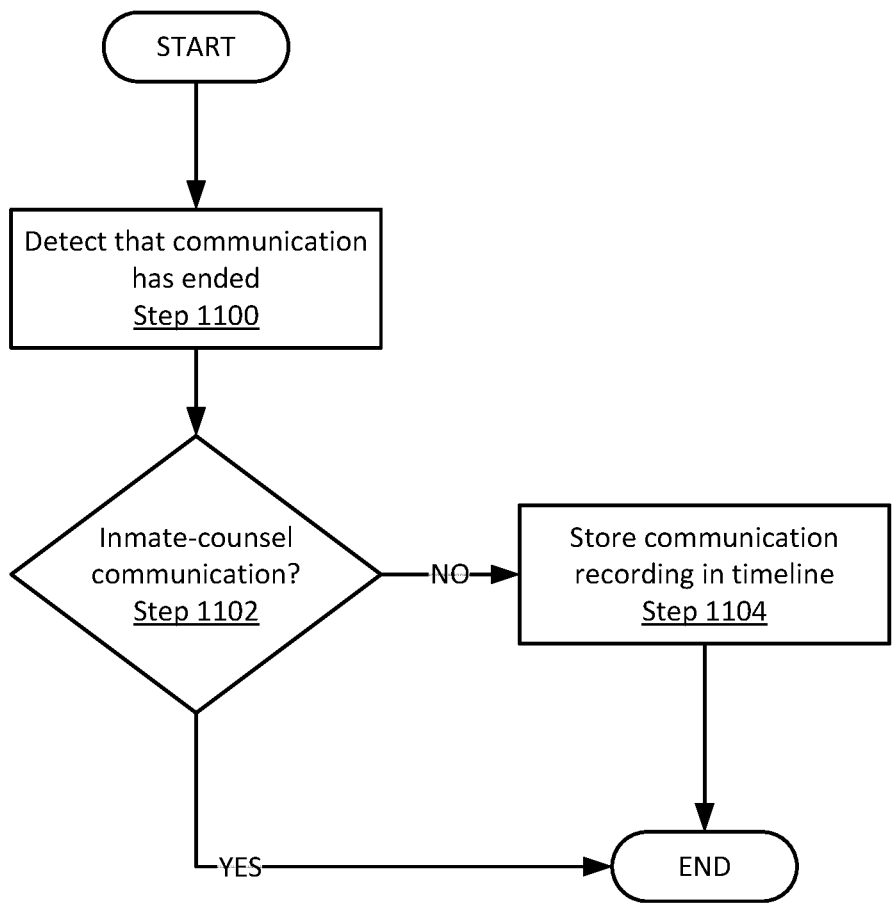
FIG. 11 shows a flowchart of a method for saving communications in accordance with one or more embodiments of the invention.

FIG. 11 shows a flowchart of a method for storing communication, in accordance with one or more embodiments of the invention. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 11 should not be construed as limiting the scope of the invention.

In Step 1100, the end of a communication is detected. The end of the communication may be detected in any manner now known or later developed.

In Step 1102, a determination is made whether the communication was an inmate-counsel communication. If the communication was an inmate-counsel communication, then the method ends. If the communication was not an inmate-counsel communication, the method proceeds to Step 1104.

In Step 11104, the communication recording is stored in the timeline. After Step 1104, the method ends.

Figure 12:
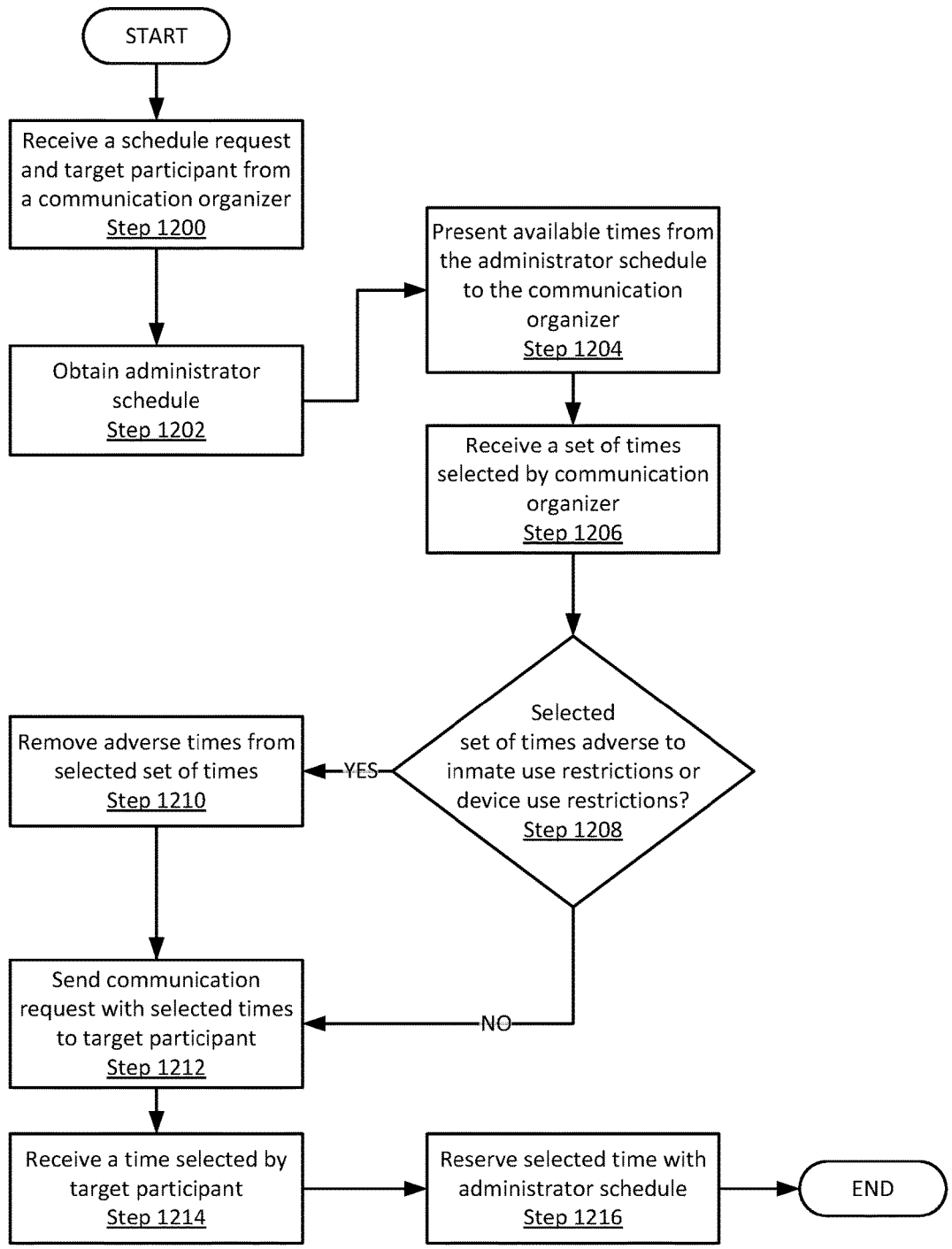
FIG. 12 shows a flowchart of a method for setting a schedule in accordance with one or more embodiments of the invention.

FIG. 12 shows a flowchart of a method for setting a schedule, in accordance with one or more embodiments of the invention. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 12 should not be construed as limiting the scope of the invention.

In Step 1200, a schedule request and target participant are received from a communication organizer.

In Step 1202, an administrator schedule is obtained.

In Step 1204, available times are presented from the administrator schedule to the communication organizer.

In Step 1206, a set of times selected by communication organizer is received.

In Step 1208, a determination is made whether the selected set of times are adverse to inmate use or device use restrictions. If the set of times are not adverse, the method proceeds to Step 1212. If the set of times are adverse, the method proceeds to Step 1210.

In Step 1210, adverse times are removed from the selected set of times.

In Step 1212, a communication request with the selected time is sent to the target participant.

In Step 1214, a selected time is received by the target participant.

In Step 1216, the selected time is reserved with the administrator schedule. After Step 1216, the method ends.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
a processor;
a server system configured to execute on the processor and configured to:
generate, in response to a connection request, a connection for a communication between an inmate mobile device and an outsider mobile device after a determination that an inmate verification data and verified data match, the inmate verification data obtained from an inmate user and the verified data from the inmate user of the inmate mobile device,
generate a communication recording of the communication,
provide access to the communication recording for an administrator user via an administrator view of an inmate timeline, and
restrict access to the communication recording of the inmate mobile device via the inmate timeline,
wherein the administrator view of the inmate timeline is used by the administrator user for investigation of the inmate user and the outsider user, and
wherein the inmate timeline is used to facilitate exchanging information by the inmate user and an outsider user through a secure social network.

2. The system as recited in claim 1, further comprising: a restrictions repository configured to prevent generation of the connection request based on pre-determined criteria.

3. The system as recited in claim 2, wherein the pre-determined criteria includes an inmate being punitively prevented from communicating with outsiders.

4. The system as recited in claim 3, wherein the inmate is being punitively prevented from communicating with outsiders for specific portions of a day.

5. The system as recited in claim 2, wherein the pre-determined criteria includes the inmate attempting to communicate with individuals on a do not contact list.

6. A non-transitory computer readable medium comprising instructions for causing a computer system to perform operations, the operations comprising:
generating, in response to a connection request, a connection for a communication between an inmate mobile device and an outsider mobile device after a determination that an inmate verification data and verified data match, the inmate verification data obtained from an inmate user and the verified data from the inmate user of the inmate mobile device,
generating a communication recording of the communication,
providing access to the communication recording for an administrator user via an administrator view of an inmate timeline, and
restricting access to the communication recording of the inmate mobile device via the inmate timeline, wherein the administrator view of the inmate timeline is used by the administrator user for investigation of the inmate user and the outsider user, and wherein the inmate timeline is used to facilitate exchanging information by the inmate user and an outsider user through a secure social network.

7. The non-transitory computer readable medium as recited in claim 6, the operations further comprising preventing generation of the connection request based on pre-determined criteria.

8. The non-transitory computer readable medium as recited in claim 7, wherein the pre-determined criteria includes an inmate being punitively prevented from communicating with outsiders.

9. The non-transitory computer readable medium as recited in claim 8, wherein the inmate is being punitively prevented from communicating with outsiders for specific portions of a day.

10. The non-transitory computer readable medium as recited in claim 7, wherein the pre-determined criteria includes the inmate attempting to communicate with individuals on a do not contact list.

11. The non-transitory computer readable medium as recited in claim 6, wherein the connection is flagged for follow-up investigation if a warrant check of an outsider ID indicates the possibility of outstanding warrants.

12. The system as recited in claim 1, wherein the inmate timeline comprises a link to a video visitation archive.

13. The system as recited in claim 1, wherein determining that an inmate verification data and verified data match comprises comparing a digital signature of a pre-recorded clip and audio of the inmate user speaking a pre-recorded phrase.

14. The non-transitory computer readable medium as recited in claim 6, wherein the inmate timeline comprises a link to a video visitation archive.

15. The non-transitory computer readable medium as recited in claim 6, wherein determining that an inmate verification data and verified data match comprises comparing a digital signature of a pre-recorded clip and audio of the inmate user speaking a pre-recorded phrase.

16. A method comprising:
generating, in response to a connection request, a connection for a communication between an inmate mobile device and an outsider mobile device after a determination that an inmate verification data and verified data match, the inmate verification data obtained from an inmate user and the verified data from the inmate user of the inmate mobile device, generating a communication recording of the communication, providing access to the communication recording for an administrator user via an administrator view of an inmate timeline, and restricting access to the communication recording of the inmate mobile device via the inmate timeline, wherein the administrator view of the inmate timeline is used by the administrator user for investigation of the inmate user and the outsider user, and wherein the inmate timeline is used to facilitate exchanging information by the inmate user and an outsider user through a secure social network.

17. The method as recited in claim 16, further comprising preventing generation of the connection request based on pre-determined criteria.

18. The method as recited in claim 17, wherein the pre-determined criteria includes an inmate being punitively prevented from communicating with outsiders.

19. The method as recited in claim 18, wherein the inmate is being punitively prevented from communicating with outsiders for specific portions of a day.

20. The method as recited in claim 16, wherein determining that an inmate verification data and verified data match comprises comparing a digital signature of a pre-recorded clip and audio of the inmate user speaking a pre-recorded phrase.

\* \* \* \* \*